Figure 1:
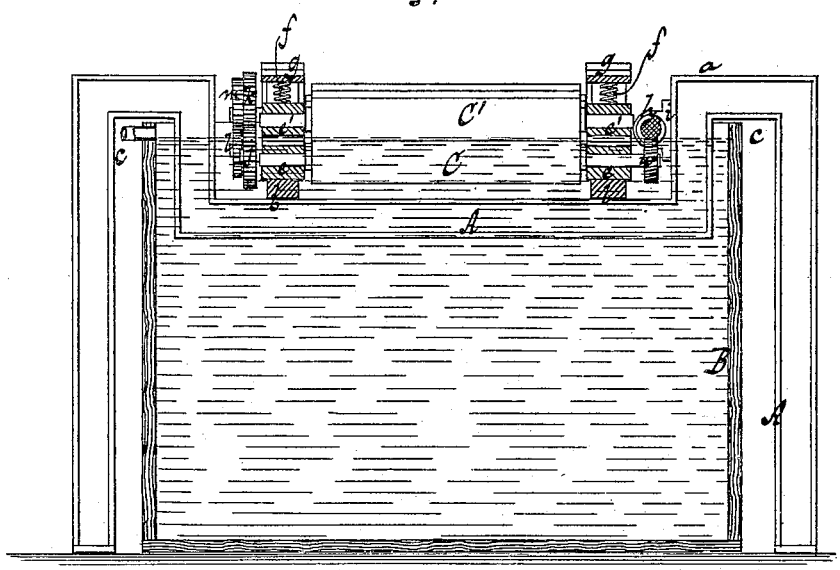

(No Model.) 2 Sheets—Sheet 1.

A. ANGELL.
APPARATUS FOR TREATING VEGETABLE FIBERS.

No. 245,425. Patented Aug. 9, 1881.

(No Model.) 2 Sheets—Sheet 2.
A. ANGELL.
APPARATUS FOR TREATING VEGETABLE FIBERS.
No. 245,425. Patented Aug. 9, 1881.
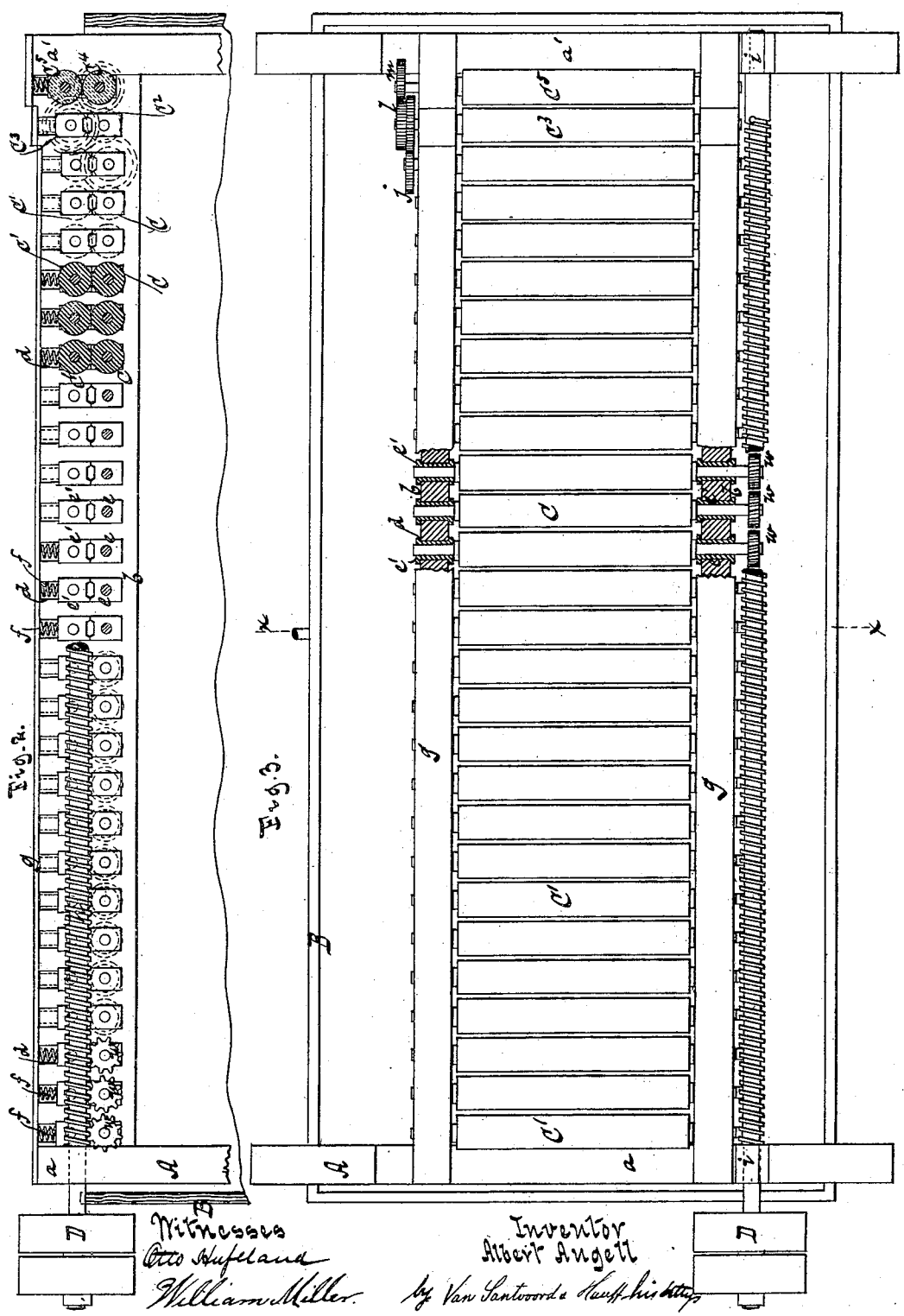

UNITED STATES PATENT OFFICE.

ALBERT ANGELL, OF EAST ORANGE, NEW JERSEY.

APPARATUS FOR TREATING VEGETABLE FIBERS.

SPECIFICATION forming part of Letters Patent No. 245,425, dated August 9, 1881.

Application filed May 11, 1881. (No model.)

*To all whom it may concern:*

Be it known that I, ALBERT ANGELL, a citizen of the United States, residing at East Orange, in the county of Essex and State of New Jersey, have invented new and useful Improvements in Apparatus for Treating Vegetable Fibers, of which the following is a specification.

This invention relates to certain improvements in that class of apparatus for extracting gum from vegetable fibers in which rollers are arranged in a tank of water and compress and release the fiber while under water.

My invention consists in a novel construction and arrangement of the rollers.

This invention is illustrated in the accompanying drawings, in which Figure 1 represents a transverse vertical section of my apparatus, the plane of section being indicated by the line $x\ x$, Fig. 3. Fig. 2 is a sectional side view. Fig. 3 is a sectional plan or top view.

Similar letters indicate corresponding parts.

In the drawings, the letter A designates a frame composed of two end pieces, $a\ a'$, which are connected by bars $b\ b$. By referring to Fig. 1 it will be seen that the end pieces, $a\ a'$, are constructed with recesses $c\ c$, so that the frame A can be placed over a tank or vat, B, the top edge of which rises above the bars $b\ b$. These bars are set on edge, and they are provided with a series of slots, $d\ d$, each of which is deep enough to receive two journal-boxes, $e\ e'$, and a spring, $f$, which presses on the upper journal-box, $e'$, and is held in position by a top bar, $g$, one of which is secured to the upper edge of each of the bars $b$. The journal-boxes $e\ e'$ form the bearings for the axles of the squeezing-rollers C C', which are arranged in pairs close together, all the lower rollers being in one and the same plane, with the exception of the last two pairs of rollers, $C^2\ C^3\ C^4\ C^5$, the roller $C^2$ being placed somewhat above the level of the rollers C, and the roller $C^4$ somewhat above the level of $C^2$, as shown in Fig. 2.

On one end of the axle of each of the rollers C is mounted a worm-wheel, $w$, and all these worm-wheels engage with an endless screw, $h$, which has its bearings in boxes $i$ secured to the frame A, and to which a rapid revolving motion is imparted by a belt and a pulley, D, or by any other suitable means. By the action of the screw $h$, therefore, all the rollers C in the gang receive a revolving motion, and since the upper rollers, C', are depressed upon the lower rollers by the spring $f$, the upper rollers revolve by frictional contact. The elevated roller $C^2$ is geared with the last roller C in the gang by cog-wheels $j\ k$, Figs. 1 and 3, and the roller $C^2$ is geared with the roller $C^4$ by cog-wheels $l\ m$, so that a revolving motion is also imparted to these rollers.

The tank B is filled with water to a level about half an inch (more or less) above the lines of contact between the rollers C C', and it is provided with an overflow-pipe, $n$, so that a constant level can be maintained. The fibers, after having been freed from pith and bark, are well boiled in water or in an alkaline solution, and they are then passed through between the gang of rollers, being fed in at the end $a$, Fig. 3, of the frame A. In passing through between the successive pairs of rollers the fiber is first squeezed, and as the same in its passage from one pair of rollers to the next is submerged under water, the loose gum is separated before it reaches the next pair of squeezing-rollers, and in this manner the fiber is subjected to alternating squeezing and washing actions within the water in the tank, and as these operations are repeated the amount of gum contained in the fiber is gradually lessened until said fiber, as it reaches the rollers C C', has become entirely freed from gum. On reaching the rollers $C^2\ C^3\ C^4\ C^5$ the fiber is gradually raised out of the water, and by the action of these rollers the water yet contained in the fiber is squeezed out, and the fiber finally discharged over the end $a'$ of the frame A in a comparatively dry state. To effect this purpose in the best possible manner I prefer to make the rollers $C^2\ C^3\ C^4\ C^5$ of india-rubber, similar to the rollers of clothes-wringers, while the rollers C C' are made of metal, and slightly roughened on their surfaces, so that they take a firm hold of the fibers and carry the same forward without fail.

It is most essential that during the squeezing and washing process of the fiber the water in the tank B shall be kept as clean as possible, and for this reason a good supply of running water must be admitted to the tank.

The fibers are fed to the machine in bunches, which must be somewhat spread out, but not too much to prevent them from wrapping round the rollers. Care must be taken to feed the bunches straight to the machine, and to keep them straight until they have passed almost entirely through the first pair of rollers. After that they will go straight of their own accord. The rollers are turned at the rate of about forty revolutions per minute. After the fibers have been squeezed and washed they are dried, and the same machine may be used for softening and taking out the stiffness. This, of course, is done without any water. After having thus prepared the fiber it is ready for baling.

I do not broadly claim rollers arranged in a tank of water for squeezing and releasing the fiber while under water, as such is old and well known.

What I claim as new, and desire to secure by Letters Patent, is—

The combination, with a tank containing water, of an upper and a lower series of rollers, $C$ $C'$, one of which series is adapted to yield, and each series arranged in the same horizontal plane, the wringer-rollers $C^2$, $C^3$, $C^4$, and $C^5$ arranged above the plane of the rollers $C$ $C'$ at one end of the water-tank, for taking the fiber directly from the rollers, and mechanism gearing all of said rollers together for rotating them in unison, all substantially as shown and described.

In testimony whereof I have hereunto set my hand and seal in the presence of two subscribing witnesses.

ALBERT ANGELL. [L. S.]

Witnesses:
MARTIN DENNIS,
E. F. KASTENHUBER.